United States Patent [19]
Callender

[11] Patent Number: 5,426,504
[45] Date of Patent: Jun. 20, 1995

[54] OPTICAL DEPTH GAUGE FOR OPTICALLY ROUGH SURFACES

[75] Inventor: Alan B. Callender, Stuart, Fla.

[73] Assignee: United Technologies Corporation, Hartford, Conn.

[21] Appl. No.: 282,133

[22] Filed: Jul. 28, 1994

[51] Int. Cl.$^6$ .............................................. G01B 9/02
[52] U.S. Cl. ...................................... 356/359; 356/351
[58] Field of Search ............... 356/345, 349, 351, 359, 356/360, 353

[56] References Cited

U.S. PATENT DOCUMENTS 4,940,330  7/1990  Dopheide et al. .................. 356/349

*Primary Examiner*—Samuel A. Turner
*Assistant Examiner*—Robert Kim

[57] ABSTRACT

A depth sensor for sensing contours of an optically rough target surface includes an optic system for radiating first and second discrete areas on the target surface with first and second beams respectively of linearly polarized, coherent light of a predetermined wavelength $\lambda$. The first and second beams have an intersection point an unknown distance from and proximate to the target surface and form an acute included angle $\phi$ having a bisector approximately normal to the target surface. The light reradiated from each of the discrete areas creates a speckle pattern on a surface spaced from and facing the target surface. Interference fringes will be formed in the area of overlap between speckles from the two speckle patterns. A detector facing and approximately parallel to the target surface and spaced a predetermined distance from the intersection point provides a first signal indicative of a light intensity pattern reradiated from the first and second discrete areas onto the detector surface during a first time interval. A signal processor provides a frequency signal indicative of the spatial frequency of the light intensity pattern, which will include interference fringes, as a function of the first signal and provides a third signal indicative of the unknown distance during the first time interval as a function of the frequency signal, the predetermined distance, $\phi$ and $\lambda$, the third signal being characteristic of the contour of the target surface.

17 Claims, 4 Drawing Sheets

OPTICAL DEPTH GAUGE FOR OPTICALLY ROUGH SURFACES

TECHNICAL FIELD

This invention relates to sensors for measuring depth variations of optically rough surfaces and, in particular, non-contacting optical sensors.

BACKGROUND OF THE INVENTION

Several methods are used for measuring surface profiles or contours of remote surfaces. For example, using optical interferometry, which provides highly accurate measurement of surface variations, coherent light is split into two beams. A first beam is radiated onto a target surface to be measured and the light that is reflected or reradiated from the surface is combined with a second beam that has a fixed optical path length between the source and the detector. The phase difference between the two beams is proportional to the difference in path lengths, modulo $2\pi$. If the light in the reradiated beam and the second beam are in phase, they will constructively interfere and the combination will appear bright. When the two beams are 180° out of phase, they will destructively interfere and the resulting beam will appear dark. For a known wavelength $\lambda$ of light, optical detection of the phase difference by observation of light and dark areas can provide a measure of the depth of the irradiated spot.

However, optical interferometry is confounded by the phenomenon of speckle when the surface is optically rough. A surface is optically rough when the optical depth variance within a resolution cell gives a uniform phase probability distribution when reduced modulo $2\pi$. The return field from such a surface is thus the sum of a large number of unresolved point sources at different uniformly distributed random phases, and an interferometer will see the sum. This generally occurs where there are depth variations on the order of $\lambda/4$ over a length scale of $\lambda$. The amplitude seen on an image plane spaced apart from the target surface has an exponential distribution, with highest probability for an unusable small value. One may consider the use of averaging over a finite region of the surface, but the lack of correlation in height on a scale of several wavelengths of the light prevents this. Moreover, the rough surface is resolved when the lateral scale of the roughness is larger than a resolution cell of the optical system viewing the surface as a source. When a surface is rough over the entire irradiated extent, the autocorrelation function of the optical depth determines the angular distribution of the reradiated energy. If the surface is uncorrelated, or only weakly correlated, the reradiated energy will be manifested by a random speckle irradiance pattern when projected on to a second surface spaced from the irradiated surface. The spatial frequency content of the reradiated energy is such that the use of conventional interferometry is further thwarted by the lack of a useful receiver solid angle, since the phase will only be slowly changing over the speckles.

For these reasons optical methods have projected interference patterns onto the surface or have used conventional resolution and stereovision techniques to profile surfaces.

Disclosure of the Invention

It is an object of this invention to provide a surface contour sensor having high accuracy.

Another object of this invention is to provide a sensor for measuring the contours of optically rough surfaces.

Another object of this invention is to provide a contour sensor for remote surfaces.

It is yet another object of this invention to provide a non-contacting optical contour sensor for use in precision controls, contoured-part quality control, LADAR altimeters, and other ranging applications.

These and other objects are satisfied with the present invention, which is premised on a phenomenon produced when a small area of an optically rough target surface is radiated with coherent, linearly polarized source light, such as light produced by a laser. The radiated surface reradiates the light in what is called a speckle pattern, or a speckle field. The speckle pattern is the interference pattern resulting from reradiation of light from elementary sources, or scattering centers, in the optically rough target surface. The reradiated light, when projected onto an image plane facing the target surface, appears as a dark background with a seemingly random pattern of small, irregularly shaped spots of light, or speckles, having a distribution of sizes. The smallest size $s_{min}$ of the light spots in the speckle field and their spatial frequency $f_s$ depends upon the source light spot size on the target surface $L_{spot}$, the wavelength of the light $\lambda$, and the distance from the surface D, according to the equation $S_{min}=1/f_s=\lambda D/L_{spot}$. Because the interference effects that produce the speckle field are characteristic of the detailed pattern of roughness of the surface, the speckle field is highly characteristic of the surface. If the target surface is irradiated at two spaced apart discrete areas by separate source beams of coherent, linearly polarized light of the same wavelength, such as low power laser light, the elementary scattering centers in each discrete area will produce a speckle field characteristic of that area. When projected onto an image plane, some, but not all of the speckles of the two fields will overlap. Because the light reaching the overlap region between two such speckles on an image plane generally has a different path length from each of the respective discrete areas on the target surface, there will be interference between the two reradiated beams. The interference of the reradiated beams in the overlap region will appear as alternating bright and dark bands. One can think of this type of arrangement as an analog to Young's double-slit interference experiment. The spatial frequency of the bands will be related to the spatial separation d of the point sources, $\lambda$ and the distance z from the image plane to the target surface, as defined by the following equation:

$$F_s = \frac{2h\tan(\phi/2)}{(z+h)\lambda}$$

According to the invention, a method for determining the contour profile of an optically rough target surface includes the step of first irradiating two discrete areas of the target surface simultaneously with two coplanar source beams of linearly polarized light (with adequate spatial and temporal coherence) characterized by an intersection point at an unknown distance z from the surface, an included angle $\phi$ and an angle bisector approximately normal to the surface. A detector that is spaced apart from the surface produces a first signal indicative of a speckle pattern impinging on the detector during a first time interval. The first signal is then stored by a processor. The detector then produces a second speckle signal indicative of a speckle pattern impinging on the detector during a second time interval subsequent to the first, and this signal is sent to the processor. The processor then produces an output signal indicative of the displacement of the surface between the first and second time intervals as a function of the first signal and the second signal.

According the invention, a sensor for indicating the depth of an optically rough target surface, relative to a point near the surface, includes a radiant energy source, such as a low power laser, for irradiating first and second discrete areas of the target surface with first and second coplanar source beams, respectively, of coherent, linearly polarized light of wavelength $\lambda$. The first and second source beams have a predetermined included angle $\phi$, wherein the bisector of the included angle is preferably approximately normal to the target surface. The first and second discrete areas reradiate the light impinging upon them to produce first and second speckle patterns characteristic of the surface roughness of the first and second discrete areas, respectively. A fixed detector has a detector surface on an image plane, preferably aligned substantially parallel to the target surface, a known distance z away from the crossing point of the first and second source beams. The target surface is an unknown distance h from the crossing point that is generally much smaller than z. The distance between the target surface and the detector is thus $D = z + h$. The detector senses the light fields reradiated from the target surface and in response produces a first signal that manifests the light intensity pattern at discrete points on the detector surface, i.e. the interference pattern. A signal processor responsive to the first signal provides a second signal indicative of the spatial frequency of the light intensity pattern, preferably by fourrier transforming the first signal. The signal processor can then produce a contour signal indicative of the unknown distance h as a function of $\phi$, $\lambda$ and the known distance according to the relations:

$$F_s = \frac{2h\tan(\phi/2)}{(z+h)\lambda} \quad (1)$$

$$df/dh = \frac{2z\tan(\phi/2)}{(z+h)^2} \quad (2)$$

According to one aspect of the invention, the detector includes a linear array of elemental detectors aligned approximately in parallel with a connector line passing through the discrete areas. The array can additionally be aligned approximately with the plane formed by the first and second beams. Each element of the array provides an elemental signal indicative of the integrated radiation intensity over that element. The first signal includes each of the elemental signals.

According to another aspect of the invention, the sensor may also include an optic arrangement, such as a beam splitter, for forming the first and second source beams from a single beam of linearly polarized coherent electromagnetic radiation. The optic arrangement can also include first and second beam directors, such as prisms or mirrors, a distance S apart, approximately parallel to the linear array and approximately centered on the linear array for directing the first and second source beams respectively to the intersection point. The optic arrangement can additionally include an angling mechanism for adjusting the known distance z by adjusting $\phi$ with the director means.

According to yet another aspect of the invention, the sensor includes a clock for producing a time signal indicative of time. The processor is additionally responsive to the time signal and the contour signal at two different times for providing a velocity signal indicative of the rate of change of the contour signal with respect to time. The sensor can include a positioning mechanism for producing a position signal indicative of the position of the intersection point relative to the target surface in a plane approximately parallel to the target surface. The processor, in this arrangement, is additionally responsive to the position signal and the contour signal for providing a profile signal that maps the contours of the target surface.

According to another aspect of the invention, the sensor also includes a feedback system for maintaining the unknown distance within a predetermined range. The feedback system can include, for example, a controller responsive to either of the velocity signal or the profile signal for producing a control signal. The angling mechanism adjusts $\phi$ in response to the control signal such that the unknown distance is kept within a predetermined range. The angling mechanism can further include means capable of dithering $\phi$, or periodically varying $\phi$, by small amounts about a known bias angle.

According to another aspect of this invention, the sensor also determines the velocity and acceleration of the target surface by taking the first and second time derivatives of the contour signal. A fourth signal indicative of the velocity of the object surface is a function of the first speckle signal, the second speckle signal and the time interval between the first and second time intervals. A fifth signal indicative of the acceleration of the object surface is a function of the same variables.

A feature of the invention is that it can be used for precision controls, contoured part quality control, LADAR altimeters, and other applications.

The present invention, and other objects, benefits and features, will be more fully understood from the following description of the invention with reference to the illustrations appended hereto.

BEST MODE OFR CARRYING OUT THE INVENTION

Figure 1:
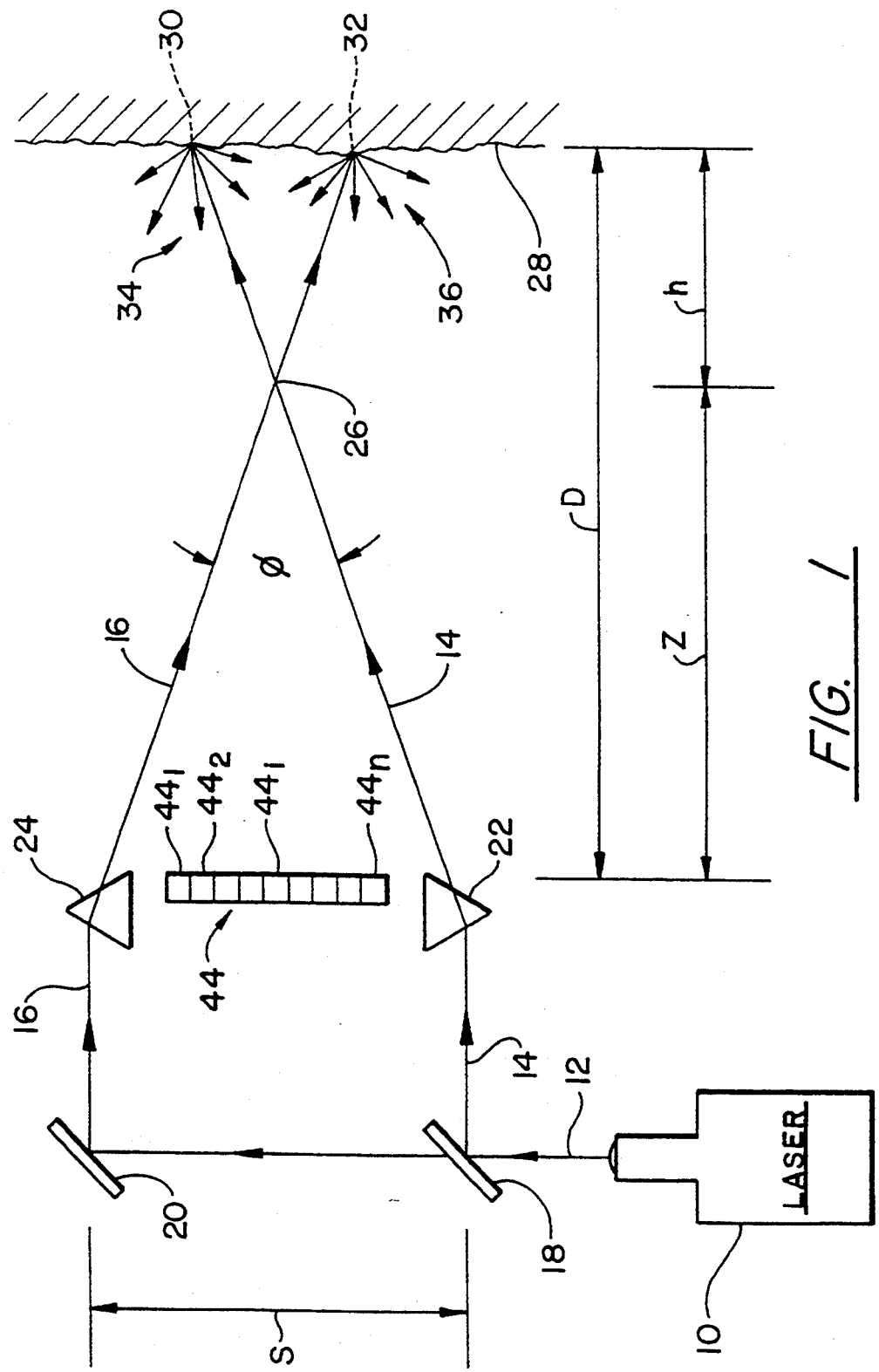
FIG. 1 is a schematic illustration of an optical arrangement for a sensor of this invention.

Referring now to FIG. 1, a low power laser 10 provides a source of linearly polarized light of wavelength $\lambda$. A beam 12 of the light emitted from laser 10 is split into a first source beam 14 and a coplanar second source beam 16 respectively by a half-silvered first mirror 18 and a second mirror 20. A first prism 22 and a second prism 24 spaced a distance S apart from the first prism 22 direct the first and second source beams 14, 16 respectively to converge at an intersection point 26 with a predetermined included intersection angle $\phi$. Mirrors or other optical devices can also be used to direct the source beams 14, 16. The intersection point 26 is an undetermined distance h from an optically rough target surface 28, wherein the bisector of $\phi$ is approximately normal to a plane approximately tangent to the surface 28.

Figure 2:
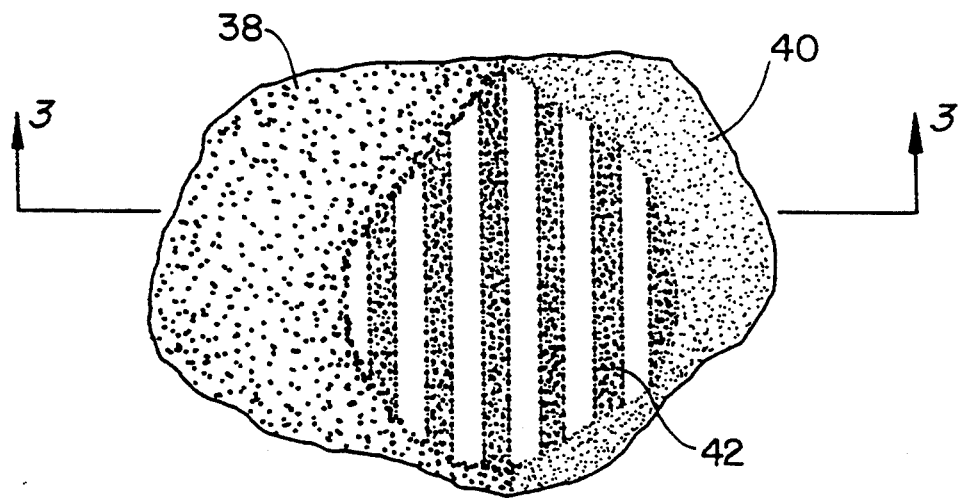
FIG. 2 is a functional block diagram of the components of a preferred embodiment of the invention.
Figure 3:
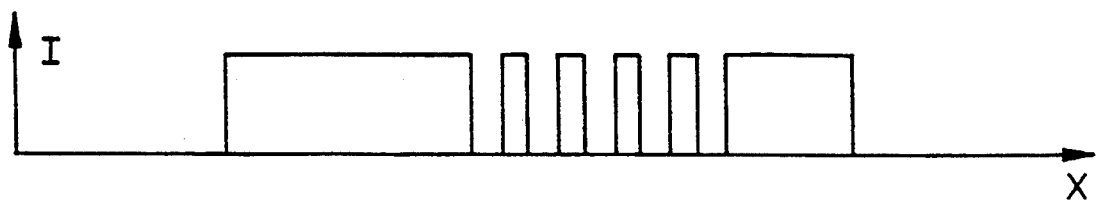
FIG. 3 illustrates the appearance of two typical speckles on an image plane and interference fringes in an overlap region between the speckles.

The first source beam 14 irradiates a first discrete area 30 and the second source beam 16 irradiates a second discrete area 32 of the target surface 28. Each of the first discrete area 30 and the second discrete area 32 reradiates the light back over a large solid angle. The reradiated light 34 from the first discrete area 30 forms a first speckle pattern characteristic of the surface irregularities in the first discrete area 30. The reradiated light 36 from the second discrete area 32 forms a second speckle pattern characteristic of the surface irregularities in the second discrete area 32. The individual speckles that make up each of the first and second speckle patterns generally do not register with each other, but rather they overlap in a random manner. FIG. 2 illustrates the appearance of a first speckle 38 from a first speckle pattern and a second speckle 40 from a second speckle pattern overlapping. In the region where the speckles 38, 40 overlap, interference fringes 42 are formed. The intensity pattern measured in a line across the speckles is illustrated in FIG. 3.

A detection system for detecting the spacial frequency of the interference fringes 42 in the overlap region of speckles from the first speckle pattern and the second speckle pattern includes a detector 44, preferably a linear CCD array, having a detector surface 46 on an image plane facing and approximately parallel to the target surface 28 and spaced a predetermined distance z from the intersection point. The detector 44 in the embodiment illustrated is made up of n elemental CCD detectors 44i, where i=1, 2, ... n, that are arrayed linearly midway between the director prisms 22, 24. Each elemental detector 44i is capable of providing an elemental signal indicative of the light intensity pattern reradiated from the first and second discrete areas onto the detector surface of each elemental detector during a first time interval. A first signal indicative of the light intensity pattern across the detector 44 is formed from the elemental signals.

Figure 4:
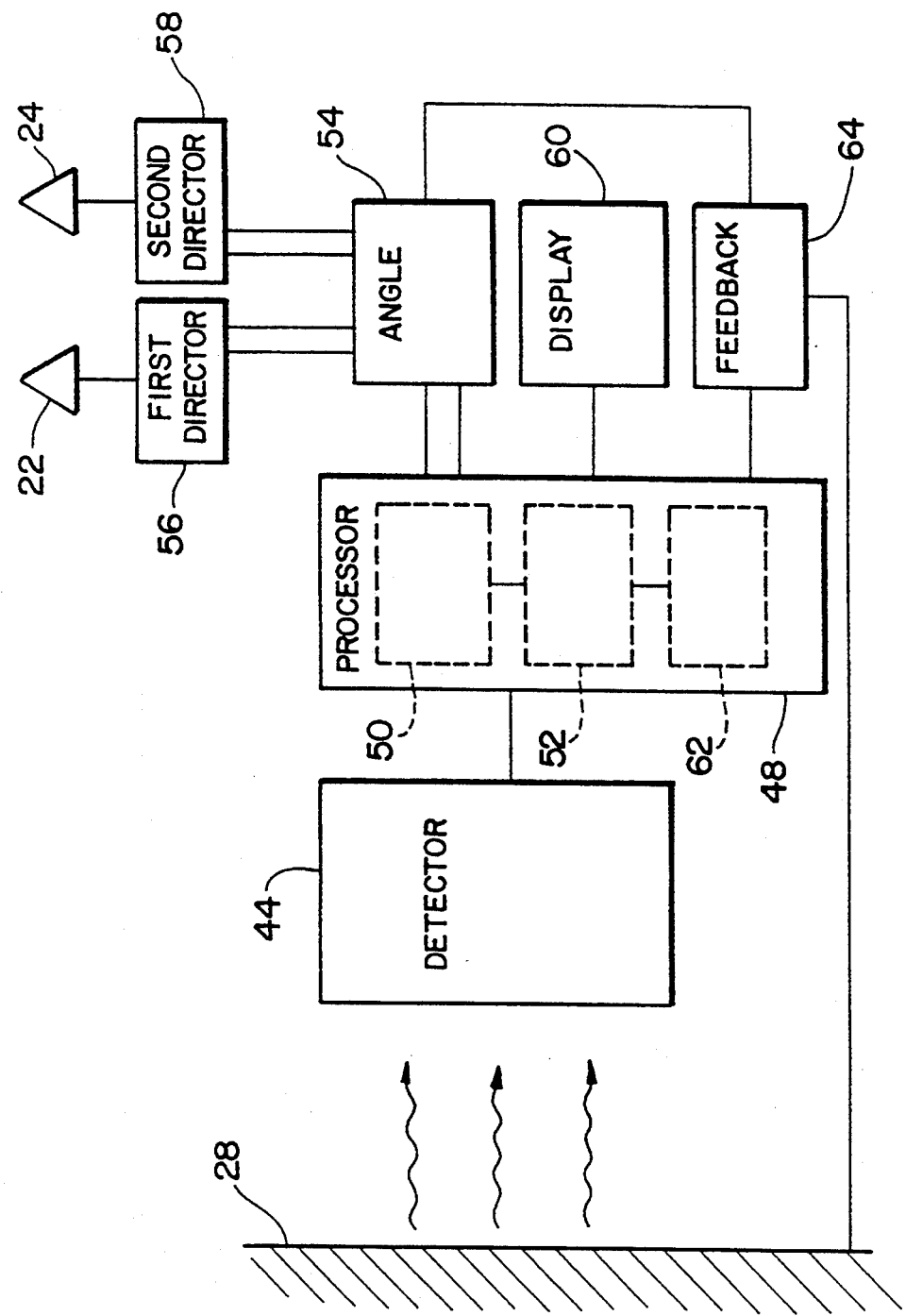
FIG. 4 is a plot of intensity I versus distance X along the line 3—3 in FIG. 2.

A signal processor 48, functionally illustrated in block diagram form in FIG. 4, includes a first processor means 50 responsive to the first signal that provides a second signal indicative of the spatial frequency f of the interference pattern. The first processor means 50 can be a commercially available fourrier transform circuit for fourrier transforming the first signal and selecting the high frequency peak in the frequency spectrum thereby obtained. Alternatively, this function can be provided by software according to well known methods. A second processor means 52 responsive to the second signal provides a third signal indicative of the unknown distance h during the first time interval as a function of the second signal (f), the predetermined distance z, $\phi$ and $\lambda$ according to the relations set forth in equations 1 and 2, above. This function can also be accomplished either with hardware or software.

The variation of the contour can be determined by determining the difference between two contour measurements taken during different time intervals a spaced time t apart. If, for example, the target surface is moving at a known rate in a plane perpendicular to the sensor, then a contour profile can be mapped by compiling a plurality of measurements of h at regularly spaced time intervals. Alternatively, the contour can be mapped by incrementally changing the in-plane position of the target surface in a known way and taking a depth measurement at each point.

The included angle $\phi$ may be fixed or variable. If $\phi$ is fixed by the optical arrangement, then this parameter would be preprogrammed into the processor 48.

Typical practical parameters for a sensor as herein described would be, for a light source at 750 nm, S=1 cm, and z=1.5 cm. The total number of detector elements determines the spatial frequency resolution through the record length of the first signal, so it is important to have a long array. A variety of array detectors are commercially available. For example, the Fairchild/Loral CCD151 is a 3456 element linear array having 7 $\mu$m $\times$ 7 $\mu$m elements with no dead space and is readable at 1250 frames/sec. If a tracking filter is used for determining f, then the data latency is approximately 800 $\mu$s. If a fast fourrier transform (FFT) processor is used, the data latency is approximately 2 ms. Even with a 1024 element array, 0.7 cm long, the frequency resolution is of the order of $f_{max}/500$, or 3/cm. This corresponds to depth resolution (change in h) of approximately 0.0004 inches in the example illustrated in FIG. 5. To retain the approximation of resolved spots, both source beams 14, 16 must focus with moderate focal depth near or just beyond the crossover. For F/# (the focal ratio)=8, the waist of uniform irradiance will be approximately 2.7 $\mu$m diameter and depth of the order of 193 $\mu$m.

Figure 5:
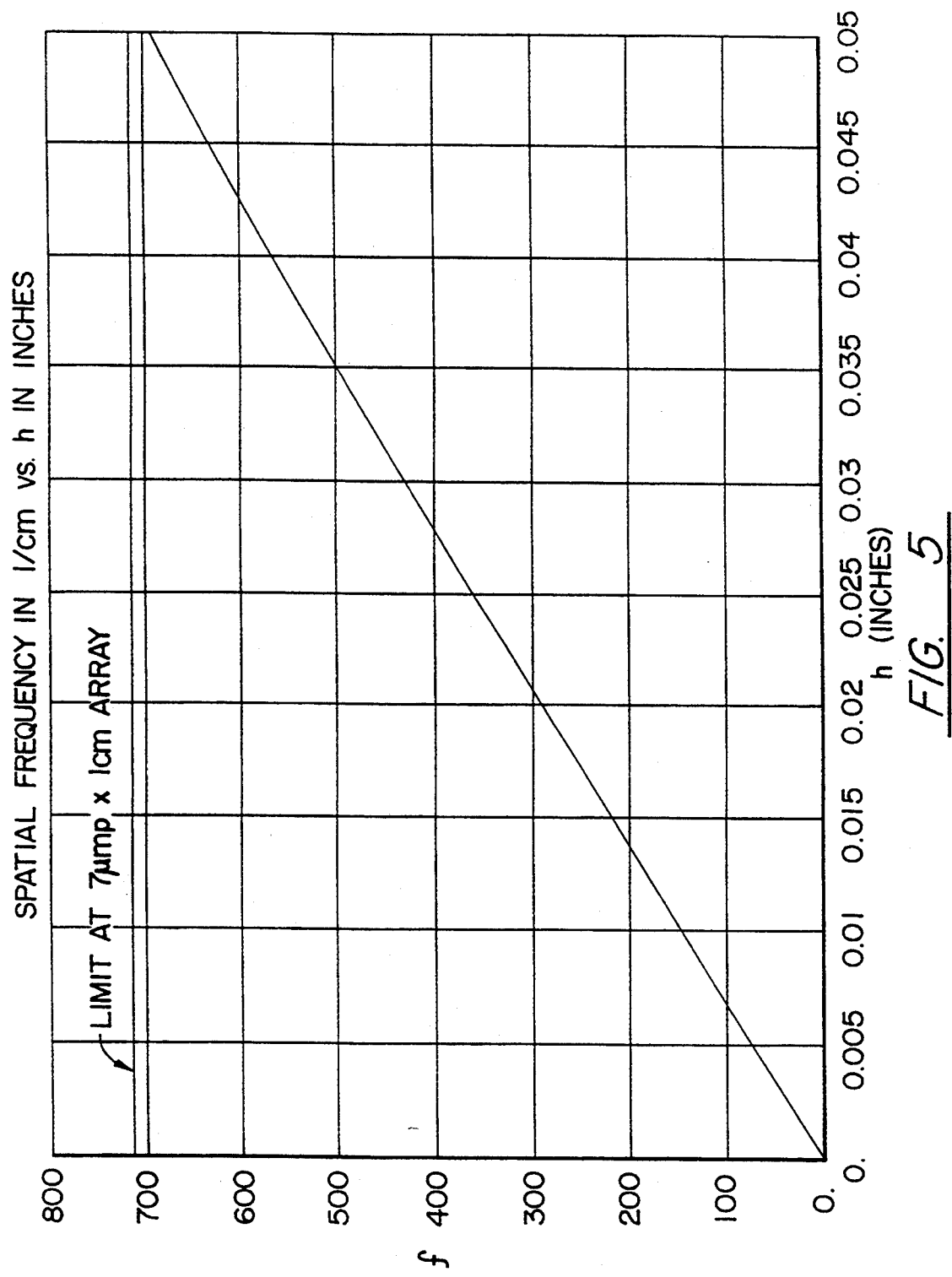
FIG. 5 is a plot of spatial frequency versus h for a typical range of sensor parameters.

The limit on the physical length of the array is set by the coherence loss, rather than the constancy of spatial frequency, since the departure for a long array can be predetermined and the data resampled for constant spatial frequency. In FIG. 5, spatial frequency in cm$^{-1}$ is plotted against h in inches for a 7 $\mu$m pitch, 1 cm array. A preferred operating range for h is in the middle, between 0.003 cm and 0.04 cm.

In another operating mode, $\phi$ can be varied by including in the sensor an angling mechanism 54 for changing the orientation of the directors 22 and 26. The angling mechanism can dither $\phi$ about a known bias angle in order to provide a sensitive test for small displacements about a crossover (i.e. h=0). The bias angle may be changed via mechanical drivers 56 and 58, each controlled by the angling mechanism according to feedback from the processor 48, that tilt mirrors 22 and 24 respectively as required to maintain a symmetric dither about crossover. The depth contour measurement can then come from precision encoders (not shown) on the drivers 56 and 58 providing position information to the processor.

The third signal can be output directly to a display 60, time averaged by averaging means 62 in the processor 48, or a time derivative taken to obtain a rate of change of h.

A feedback mechanism 64 can be operably connected to the target surface 28 to provide gross movement of the sensor relative to the target surface 28 if they are too close together or too far apart for proper operation of the sensor. The feedback mechanism 64 can also be operatively connected to the angling mechanism 54 to permit fine adjustments of the operating range.

Remote sensing can be accomplished by using fiber optic elements (not shown for simplicity) to convey the reradiated light 34, 36 from near the target surface 28 to the detector 44 at a distant location. The first and second source beams 14, 16 can also be brought to the target surface 28 from a remotely located laser light source 10 by fiber optics. In this configuration, the sensitive electronic and electro-optic elements are kept out of harsh or hazardous environments. This configuration can also be provided to shield the sensor from the effects of lightning and EMI.

The method improves over the prior art in allowing rapid tracking of the contour of an optically rough surface through non-contacting gauging using the roughness to generate a measure of defocus (beam crossover) depth. It should complement existing methods, such as by projecting interference systems onto the surface and imaging the apparent distortion to infer surface relief. It should allow rapid operation of a system to rotate and translate a part in three dimensions to remain within the sensitive range, while recording the motions necessary to do this. The sensitive range may be extended by increasing the wavelength or by reducing the crossing angle $\phi$.

It should be understood that the beams 14 and 16 do not necessarily have to intersect or cross at 26 as shown in FIG. 1. They may diverge or be oriented to theoretically intersect behind the object 28, defining the angle $\phi$ and the unknown distance. If they simply diverge, the factor z+h in equation 1, becomes h-z; if they intersect behind the object (extending their respective paths through the object); and the factor is z-h if they diverge. If the beams diverge, the angle $\phi$ is defined by extending the beam paths until they intersect. Likewise, the angle $\phi$ defined by the intersection of the beam paths extended behind the object when the beams converge, but do not actually intersect between the object 28 and the detector 44. In any of these variations, of course, the beams will produce the reflected or reradiated light 34 and 36.

One skilled in the art may be able to make modifications and variations to the foregoing embodiments, in addition to any described without departing from the true scope and spirit of the invention.

I claim:

1. A depth sensor for sensing a contour of an optically rough target surface, characterized by:
   optic means for radiating first and second discrete areas on the target surface with first and second beams respectively of linearly polarized, coherent electromagnetic radiation of a predetermined wavelength $\lambda$, the first and second beam paths intersecting at a point at an unknown distance from the target surface and having an acute included angle $\phi$ having a bisector approximately normal to the target surface;
   detector means including a detector surface on an image plane facing and approximately parallel to the target surface and spaced a predetermined distance from the point for providing a first signal indicative of a radiation intensity pattern reradiated from the first and second discrete areas onto the detector surface during a first time interval; and
   a signal processor comprising first means for providing a frequency signal indicative of the spatial frequency of the radiation intensity pattern as a function of the first signal and second means for providing a third signal indicative of the unknown distance during the first time interval as a function of the frequency signal, the predetermined distance, $\phi$ and $\lambda$, the third signal being characteristic of the contour of the target surface.

2. The depth sensor described in claim 1, further characterized in that the detector means comprises a linear detector array having a plurality of elements, each element comprising means for providing an elemental signal indicative of a radiation intensity condition at the element, the first signal comprising the elemental signals.

3. The depth sensor described in claim 2, further characterized in that the optic means comprises means for forming the first and second beams from a single beam of linearly polarized coherent electromagnetic radiation.

4. The depth sensor described in claim 3, further characterized in that the optic means comprises first and second director means a distance S apart, approximately colinear with the linear array and approximately centered on the linear array for directing the first and second beams respectively to the intersection point.

5. The depth sensor described in claim 2, further comprising angling means for adjusting the known distance by adjusting $\phi$.

6. The depth sensor described in claim 5, further characterized in that the angling means comprises:
   averaging means responsive to the third signal for producing a fourth signal indicative of a time average of the third signal; and
   feedback means responsive to the fourth signal for maintaining the unknown distance within a predetermined range.

7. The depth sensor described in claim 5, further characterized in that the angling means comprises dither means for periodically varying $\phi$ by small amounts approximately a known bias angle.

8. The depth sensor described in claim 5, further characterized in that the optic means comprises spaced apart first and second director means connected to the angle means approximately colinear with the linear array for directing the first and second beams respectively to the intersection point.

9. The depth sensor described in claim 2, further characterized in that the signal processor comprises means for Fourier transforming the first signal to provide the second signal.

10. The depth sensor described in claim 9, further characterized in that the optic means comprises means for forming the first and second beams from a single beam of linearly polarized coherent electromagnetic radiation.

11. The depth sensor described in claim 9, further characterized by means for varying $\phi$ and for providing an angle signal indicative of $\phi$ to the signal processor.

12. A sensor for indicating a change of depth of an optically rough target surface from a first time interval to a second time interval subsequent to the first time interval, characterized by:
   optic means for radiating first and second spots on the target surface with narrow first and second beams respectively of linearly polarized, coherent electromagnetic radiation of a predetermined wavelength $\lambda$, the first and second beams intersecting at a point at a unknown distance h from the surface at a first point with an acute angle $\phi$ having a bisector approximately normal to the target surface;

a detector comprising a detector surface on an image plane spaced a predetermined distance z from the first point and capable of providing an intensity signal indicative of an interference pattern radiated from the first and second spots onto the detector surface;

a signal processor comprising means for providing a first frequency signal indicative of the spatial frequency of the interference pattern as a function of the intensity signal during the first time interval and for providing a second frequency signal indicative of the spatial frequency of the interference pattern as a function of the intensity signal during the second time interval, and means for providing a contour signal indicative of the change of the unknown distance h as a function of the first and second frequency signals, the predetermined distance, $\phi$, $\lambda$, and the time t between the first time interval and the second time interval.

13. The sensor described in claim 12, further characterized in that the detector comprises a linear array of elemental detectors and in that the intensity signal comprises a set of elemental signals, each elemental signal being indicative of the intensity of radiation of wavelength $\lambda$ detected by one of the elemental detectors.

14. The sensor described in claim 13, further characterized by means for varying $\phi$ and for providing an angle signal indicative of $\phi$ to the signal processor.

15. The sensor described in claim 14, further characterized in that the means for providing a first frequency signal comprises transform means for fourrier transforming the intensity signal.

16. A method of measuring the depth contour of an optically rough target surface, characterized by the steps of:

irradiating first and second spots on the target surface with first and second beams respectively of linearly polarized, coherent electromagnetic radiation of a predetermined wavelength $\lambda$, the first and second beam baths intersecting at a first point with an angle $\phi$ having a bisector approximately normal to the target surface, the first point being an unknown distance h from the target surface;

providing a first signal indicative of an interference pattern reradiated from the first and second spots onto an image plane spaced a predetermined distance z from the first point during a first time interval with a linear array detector positioned on the image plane and oriented approximately parallel to the first and second spots;

determining the spatial frequency f of the interference pattern by the fourrier transform method; and providing a contour signal indicative of h during the first time interval as a function of f, z, $\phi$ and $\lambda$.

17. The method described in claim 16, further characterized by the steps of varying $\phi$ in response to a change in the contour signal to maintain h within a predetermined range.

* * * * *